US 6,552,464 B1

(12) United States Patent
Rahbar et al.

(10) Patent No.: US 6,552,464 B1
(45) Date of Patent: Apr. 22, 2003

(54) TOTALLY INTEGRATED ENGINE COOLING MODULE FOR DC MOTORS

(75) Inventors: Mehran K. Rahbar, London (CA); Marek Horski, London (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/551,442

(22) Filed: Apr. 18, 2000

Related U.S. Application Data

(60) Provisional application No. 60/164,400, filed on Nov. 9, 1999.

(51) Int. Cl.[7] .......................... H01R 39/38; H02K 13/00; H02K 5/00; H02K 5/16; H02K 7/08
(52) U.S. Cl. .................. 310/239; 310/238; 310/90; 310/89
(58) Field of Search .................. 310/239, 227, 310/90, 89, 67 R, 64, 43, 237

(56) References Cited

U.S. PATENT DOCUMENTS

| | | | | |
|---|---|---|---|---|
| 3,644,066 A | * | 2/1972 | Heob et al. ................... 417/354 |
| 3,766,418 A | * | 10/1973 | Apostoleris ............ 310/154.13 |
| 3,789,250 A | * | 1/1974 | Macoit et al. ............... 310/154 |
| 3,794,869 A | * | 2/1974 | Apostoleris ................... 310/90 |
| 4,228,376 A | | 10/1980 | Mabuchi ....................... 310/242 |
| 4,459,087 A | | 7/1984 | Barge .......................... 417/356 |
| 4,607,184 A | | 8/1986 | Takahashi et al. ........... 310/247 |
| 4,685,513 A | * | 8/1987 | Longhouse et al. ......... 165/121 |
| 4,773,829 A | * | 9/1988 | Vettori ......................... 417/366 |
| 4,777,395 A | | 10/1988 | Taylor et al. .................. 310/90 |
| 4,823,032 A | * | 4/1989 | Ward et al. .................... 310/43 |
| 4,836,148 A | * | 6/1989 | Savage et al. ............. 123/41.49 |
| 4,840,222 A | * | 6/1989 | Lakin et al. .................. 165/47 |
| 5,006,742 A | | 4/1991 | Strobl et al. .................. 310/88 |
| 5,057,684 A | * | 10/1991 | Service .................. 250/231.13 |
| 5,159,222 A | * | 10/1992 | Southall ...................... 310/239 |
| 5,327,036 A | | 7/1994 | Carey ........................... 310/89 |
| 5,343,104 A | * | 8/1994 | Takahashi et al. ............ 310/90 |
| 5,434,460 A | | 7/1995 | Mabuchi et al. ............... 310/71 |
| 5,474,121 A | | 12/1995 | Bryson et al. ................. 165/41 |
| 5,559,674 A | * | 9/1996 | Katsui ......................... 361/697 |
| 5,689,148 A | * | 11/1997 | Rubinchik .................. 310/239 |
| 5,708,496 A | * | 1/1998 | Barnett et al. ................ 356/28 |
| 5,734,219 A | * | 3/1998 | Horski et al. ............... 310/240 |
| 5,783,881 A | * | 7/1998 | Best et al. ..................... 310/68 |
| 5,806,169 A | | 9/1998 | Trago et al. .................. 29/596 |
| 5,831,358 A | * | 11/1998 | Bobay ......................... 310/58 |
| 5,844,338 A | | 12/1998 | Horski ......................... 310/90 |
| 5,859,425 A | * | 1/1999 | Mleinek et al. ......... 250/231.13 |
| 5,982,064 A | * | 11/1999 | Umeda et al. ................ 310/90 |
| 6,020,661 A | * | 2/2000 | Trago et al. .................. 310/43 |
| 6,050,785 A | * | 4/2000 | Horng ......................... 417/354 |
| 6,232,687 B1 | * | 5/2001 | Hollenbeck et al. .......... 310/88 |
| 6,239,532 B1 | * | 5/2001 | Hollenbeck et al. ........ 310/257 |
| 6,356,003 B1 | * | 3/2002 | Fiorenza et al. ............ 310/239 |
| 6,356,005 B1 | * | 3/2002 | Hsu ........................... 310/254 |
| 6,437,471 B1 | * | 8/2002 | Ogawara et al. .............. 310/90 |
| 6,448,676 B1 | * | 9/2002 | Kershaw et al. .......... 310/68 R |
| 6,462,442 B1 | * | 10/2002 | Braun et al. ............. 310/68 B |
| 6,483,213 B1 | * | 11/2002 | Hsu ........................... 310/68 R |

* cited by examiner

*Primary Examiner*—Nestor Ramirez
*Assistant Examiner*—Pedro J Cuevas

(57) ABSTRACT

An engine cooling module includes a shroud structure 12. A housing 20 of a d.c. electric motor is formed integrally with the shroud structure 12. The housing has an open end 21. The motor has a drive shaft 26. A heat sink 22 is disposed opposite the open end and is insert molded with respect to the housing 20. The heat sink 22 defines a seat for a bearing 24 supporting the shaft 26. A flux ring assembly 48 is insert molded with respect to the housing. The flux ring assembly includes permanent magnets 33. An armature assembly 28 is disposed in the housing and fixed to the shaft for rotation in response to a magnetic field generated by the magnets 33. A commutator 32 is disposed in the housing and electrically connected with the armature assembly 28 and mounted for movement with the armature assembly. A brush card assembly 36 is coupled to the open end 21 of the housing to define an end cap covering the open end. The brush card assembly 36 has brushes 42 associated with the commutator 32. A fan 16 is coupled to the shaft 26 for rotation therewith.

14 Claims, 4 Drawing Sheets

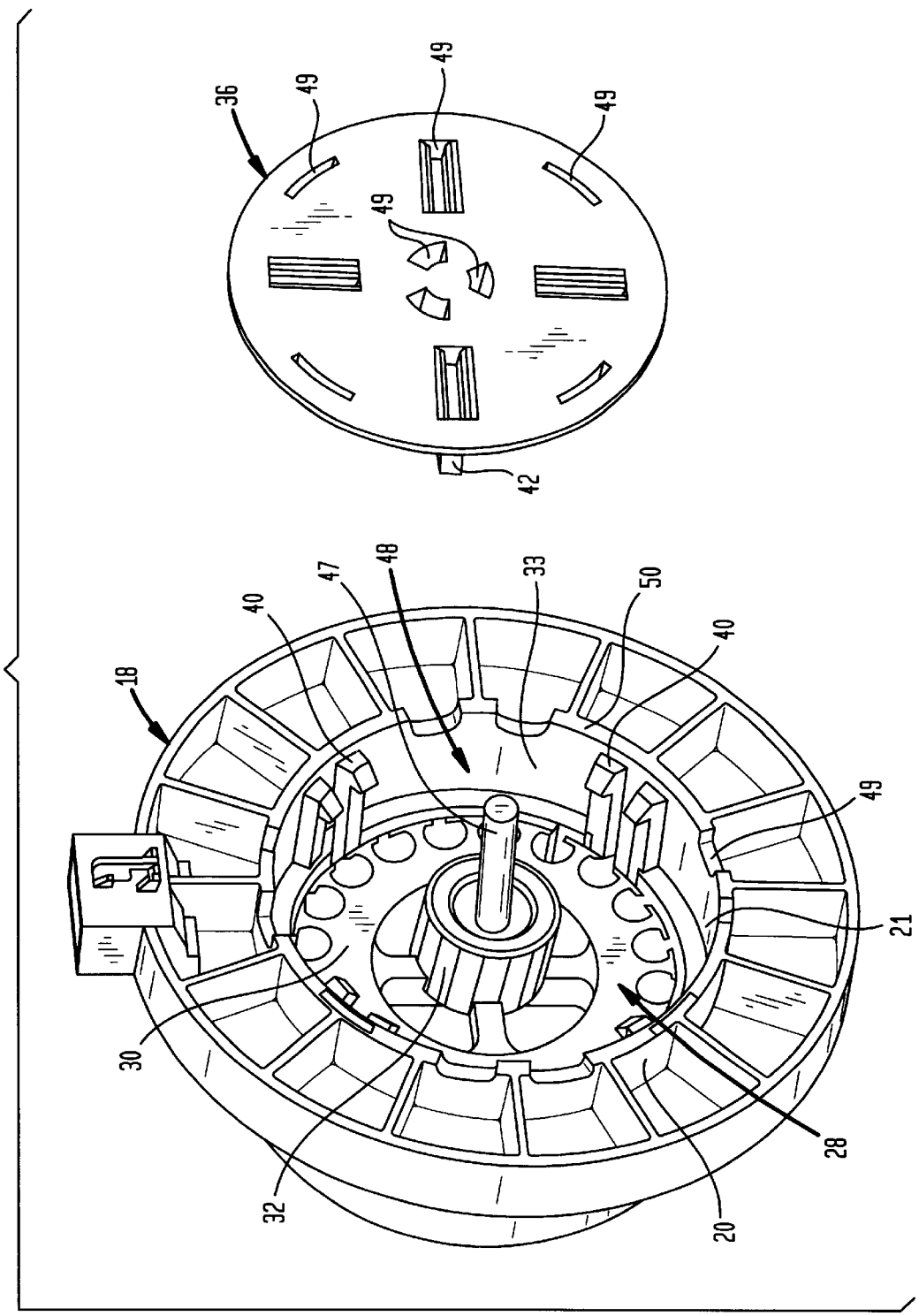

TOTALLY INTEGRATED ENGINE COOLING MODULE FOR DC MOTORS

This application claims the benefit of U.S. Provisional Application No. 60/164,400, filed Nov. 9, 1999, which is hereby incorporated by reference in its entirety herein.

FIELD OF THE INVENTION

This invention relates engine cooling modules for automotive applications and more particularly to a cooling module having fewer parts and are therefor easier to manufacture and assemble.

BACKGROUND OF THE INVENTION

Typical cooling modules for vehicle engines generally include three separate parts: a fan, an electric motor to drive the fan, and a shroud to direct air flow and to mount the module. Due to the need for separate parts, many subassemblies need to be performed to complete the final assembly of the module. Further, since the motor is separate from the shroud, the motor requires a case and end caps at both ends thereof which increases the weight of the module.

In certain applications, due to space and environmental constraints, it is desirable to provide an engine cooling module of reduced axial length and, to reduce costs, having reduced number of module parts.

Accordingly, there is a need to provide an improved cooling module for an electronically controlled engine which has a motor integrated with a fan and a shroud to provide a module having a reduced axial length and fewer parts.

SUMMARY OF THE INVENTION

An object of the present invention is to fulfill the need referred to above. In accordance with the principles of the present invention, this objective is obtained by providing an engine cooling module including a shroud structure. A housing of a d.c. electric motor is formed integrally with the shroud structure. The housing has an open end. The motor has a drive shaft. A heat sink is disposed opposite the open end and is insert molded s with respect to the housing. The heat sink defines a seat for a bearing supporting the shaft. A flux ring assembly is insert molded with respect to the housing. The flux ring assembly includes permanent magnets. An armature assembly is disposed in the housing and fixed to the shaft for rotation in response to a magnetic field generated by the magnets. A commutator is disposed in the housing and electrically connected with the armature assembly and mounted for movement with the armature assembly. A brush card assembly is coupled to the open end of the housing to define an end cap covering the open end. The brush card assembly has brushes associated with the commutator. A fan is coupled to the shaft for rotation therewith.

In accordance with another aspect of the invention, a method of providing an engine cooling module includes: integrally coupling a motor housing to a shroud structure via a molding process, the housing having an open end; insert molding a heat sink with respect to the housing to be fixed thereto opposite the open end, the heat sink defining a bearing seat for a bearing of the motor, the bearing supporting a drive shaft insert molding a flux ring assembly with respect to the housing so as to be fixed thereto, the flux ring assembly including permanent magnets; mounting an armature assembly and commutator for movement with the shaft in response to a magnetic field generated by the magnets; coupling a brush card assembly to the housing so as to cover the open end, the brush card assembly including brushes associated with the commutator, and coupling a fan to the shaft.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

FIG. 4. is an exploded view of the motor and brush card assembly of FIG. 3 as seen from the rear thereof.

DETAILED DESCRIPTION OF THE INVENTION

Figure 1:
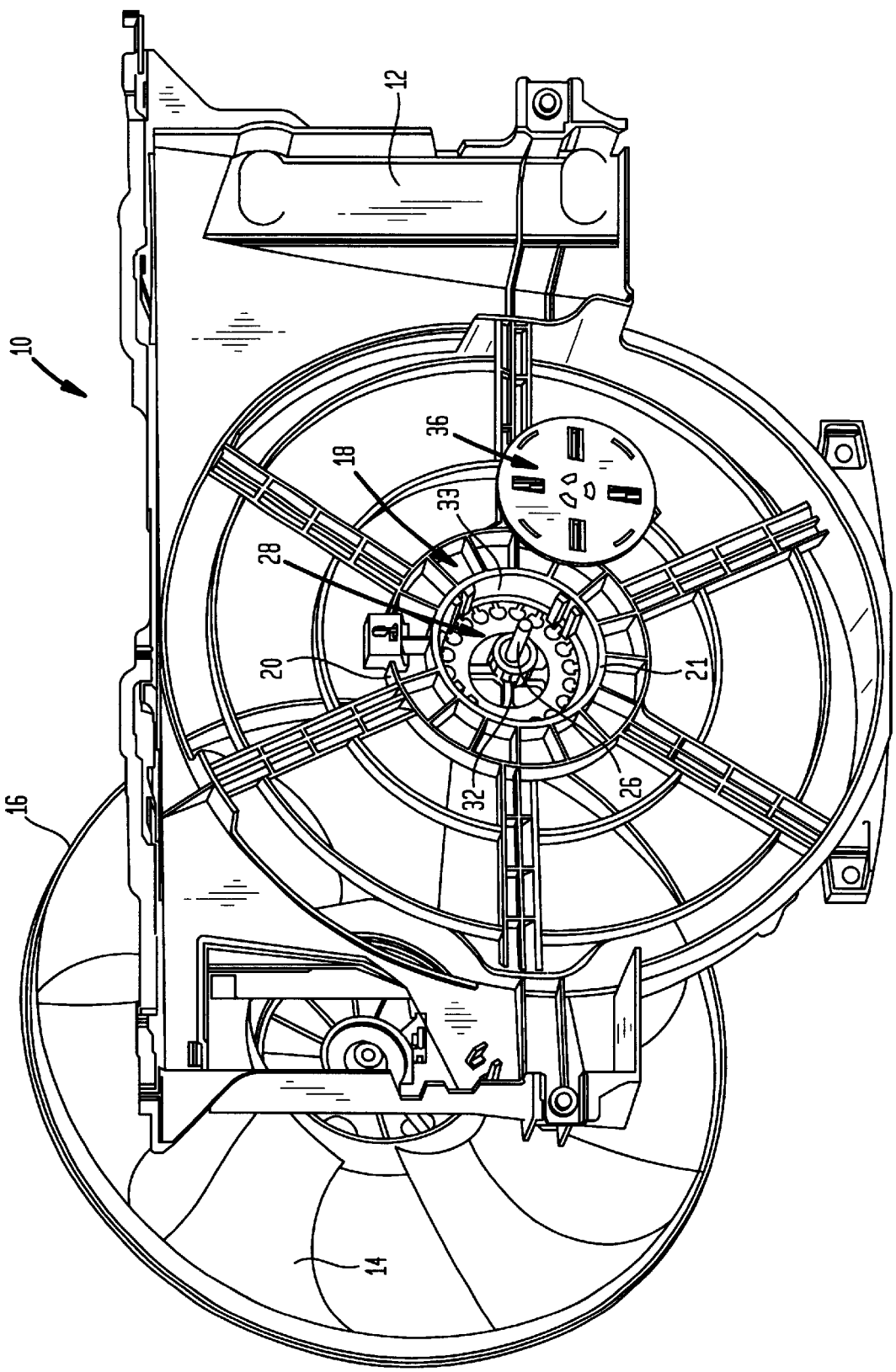
FIG. 1 is an exploded view of a engine cooling module as seen from the rear thereof, provided in accordance with the principles of the present invention.
Figure 2:
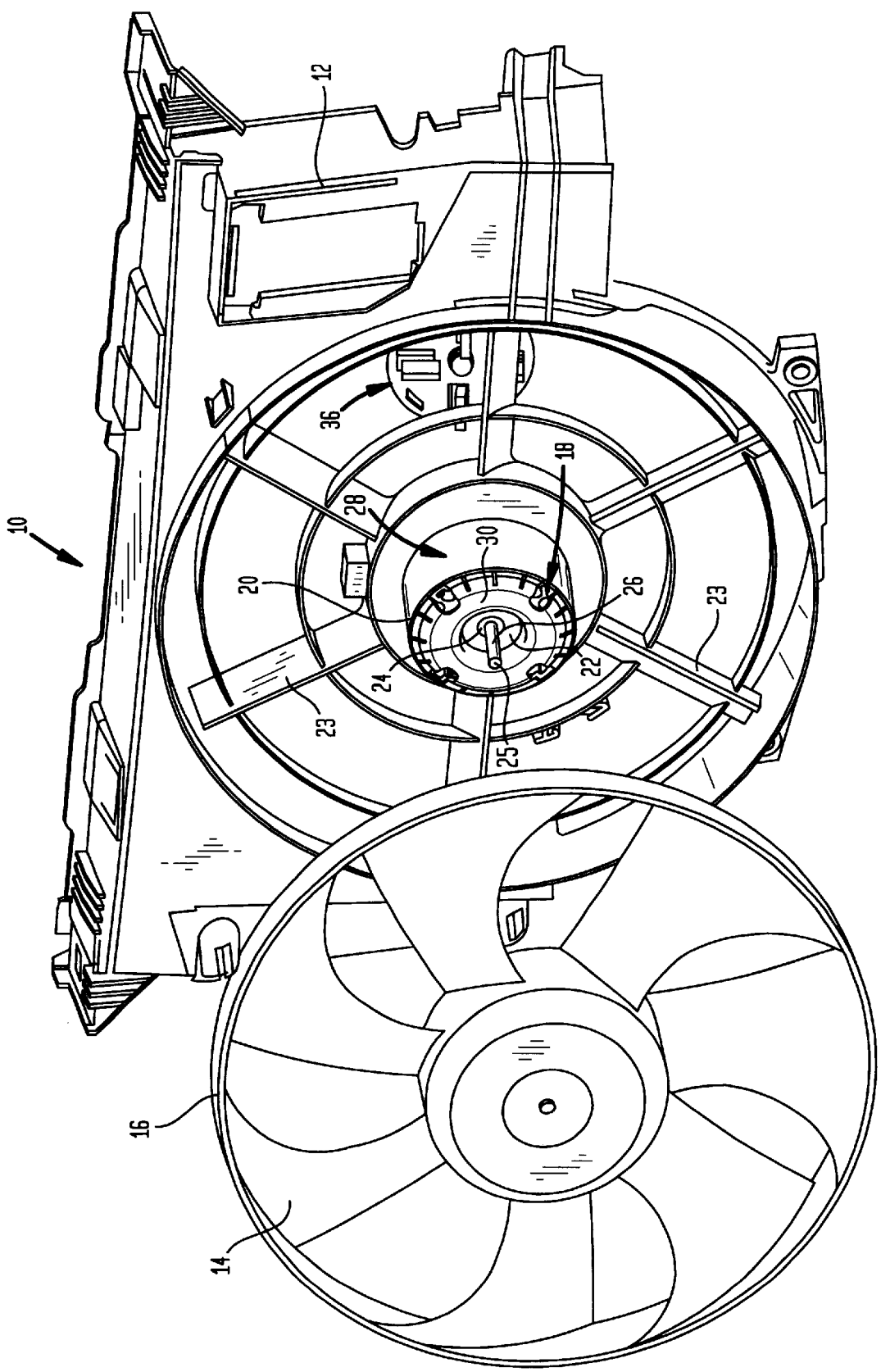
FIG. 2 is an exploded view of the engine cooling module of FIG. 1 as seen from the front thereof.

Referring to FIGS. 1 and 2, an engine cooling module is shown in exploded view, generally indicated 10, provided in accordance with the principles of the present invention. The cooling module 10 includes a shroud structure 12 formed preferably of lightweight material such as plastic. In the conventional manner when assembled, the shroud structure 12 is spaced from and generally adjacent to blades 14 of a fan 16 of the module 10.

The module 10 includes a dc electric motor, generally indicated at 18, having a housing 20 having an open end 21. The housing 20 is made of steel and over-molded, via molding material, to the shroud structure 12 so as to be integral therewith. The housing 20 is supported generally centrally of the shroud structure 12 by rib, members 23. The motor 18 includes a heat sink 22 insert molded with respect to the housing 20 at an end opposite the open end 21. Thus, during a molding process material is molded about the heat sink 22 so that the heat sink 22 is made integral with the housing 20. The heat sink 22 also provides a seat for a ball bearing 24 of the motor 18 and provides for heat dissipation from the bearing 24. As shown in FIG. 2, the bearing 24 supports an end 25 of a drive shaft 26.

As best shown in FIG. 2, the motor 18 includes an armature assembly, generally indicated at 28, mounted for rotation with shaft 26. The armature assembly 28 includes a steel core member 30 which may be solid member or may be comprised of a plurality of laminations in the conventional manner. The armature assembly 28 includes a conventional winding set (not shown) wound about the core member 30. The shaft 26 is fixed to the core member 30. Armature assembly 28 is in electrical contact with a commutator 32 (FIG. 4) and rotates in response to a magnetic field generated by permanent magnets 33 (FIG. 4) of the motor 18. The commutator 32 is mounted for movement with the armature assembly 28.

Figure 3:
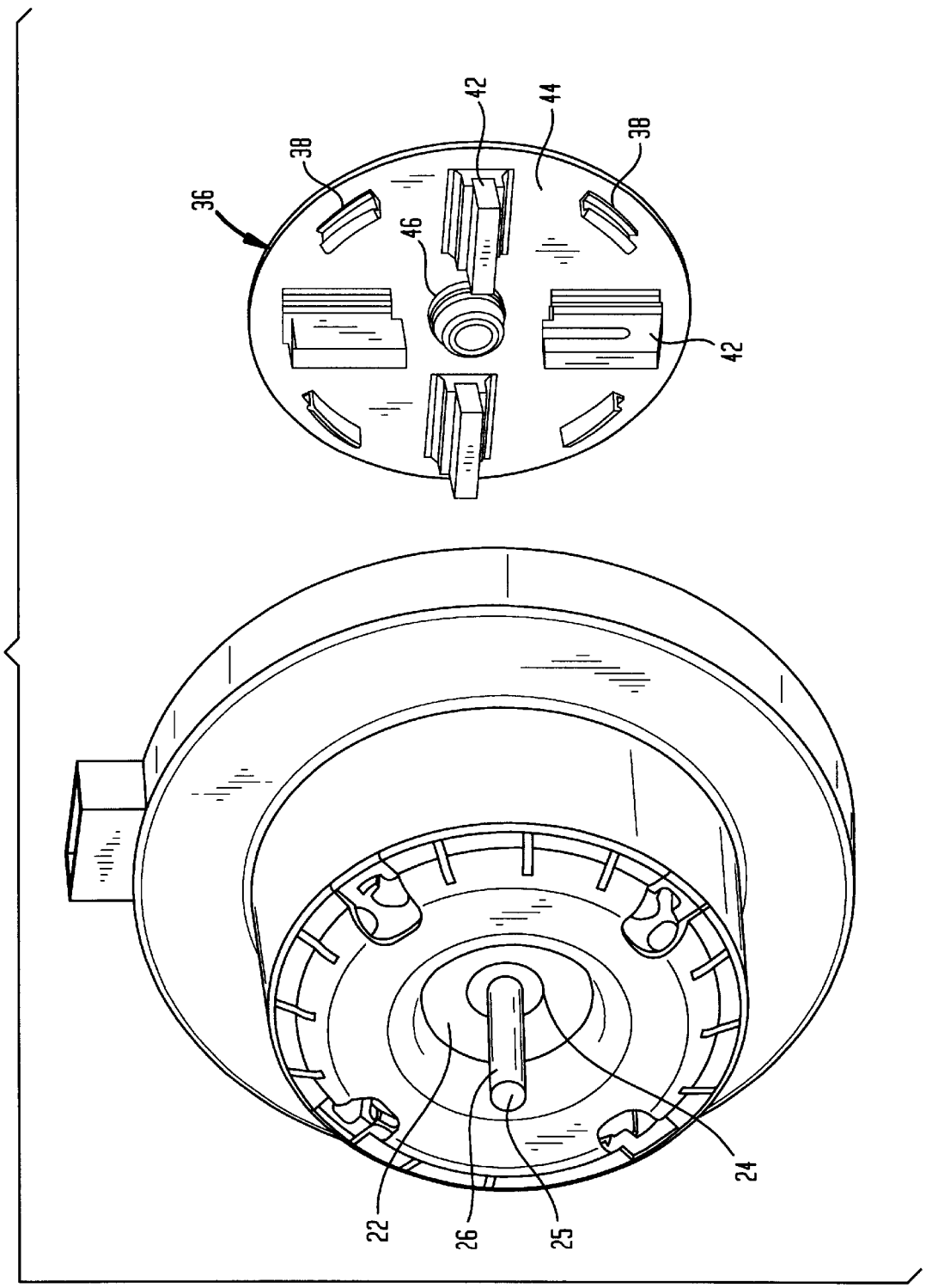
FIG. 3 is an exploded view of a motor and bush card assembly of the module of FIG. 1 as seen from the front thereof.

A disked-shaped brush card assembly, generally indicated at 36, is snap-fitted to the housing 20. In particular, with reference to FIG. 3, the brush card assembly 36 has a plurality of tabs 38 which engage associated recesses 40 (FIG. 4) defined in the motor housing 20 so that the brush card assembly 36 covers the open end 21. The brush card assembly 36 carries a plurality of brushes 42 extending from a surface 44 thereof. DC current is fed into the winding set through the brushes 42 riding on the commutator 32. The brush card assembly 36 also includes a sleeve bearing 46 which supports end 47 (FIG. 4) of the shaft 26. Openings 49 in the brush card assembly 36 and motor housing 21 provide ventilation of the motor 18 and sleeve bearing 46.

The motor 18 further includes a flux ring assembly, generally indicated at 48. The flux ring assembly 48 includes a flux ring 50 with the permanent magnets 33 fixed to the flux ring 50. In the illustrated embodiment, the flux ring 50 and magnets 33 are insert molded with respect to the motor housing 20. Thus, during a molding process the flux ring 50 and magnets are molded via plastic material to be integral with the housing 20. The insert molded flux ring 50 and magnets 33, and over-molded housing 20 advantageously eliminate the magnet-case subassembly and motor-shroud final assembly of the conventional cooling module.

The fan 16 is coupled to end 25 of the shaft 26 to rotate therewith. The motor 20 operates as a typical brush-type dc motor causing rotation of the armature assembly 28 and thus rotation of the fan 16

In the conventional manner, the cooling module 10 of the invention can be mounted as a unit to be operatively associated with a radiator of a vehicle for cooling the engine of the vehicle. The cooling module of the invention is of reduced axial length as compared to conventional cooling modules. Advantageously, the reduced axial length cooling module of the invention does not consume as much valuable engine compartment space as does conventional cooling modules.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claim is:

1. An engine cooling module comprising:
    a shroud structure,
    a housing of a d.c. electric motor formed integrally with said shroud structure, said housing having an open end, said motor having:
        a drive shaft,
        a heat sink disposed opposite said open end, said heat sink being insert molded with respect to said housing, said heat sink defining a seat for a bearing supporting said shaft,
        a flux ring assembly insert molded with respect to said housing, said flux ring assembly including permanent magnets,
        an armature assembly in said housing and fixed to said shaft for rotation in response to a magnetic field generated by said magnets,
        a commutator in said housing and electrically connected with said armature assembly and mounted for movement with said armature assembly, and
        a brush card assembly coupled to said open end of said housing to define an end cap covering said open end, said brush card assembly having brushes associated with said commutator, and
    a fan coupled to said shaft for rotation therewith.
2. The engine cooling module according to claim 1, wherein said brush card assembly is in the from of a disk with said brushes mounted on a surface thereof, said surface carrying a sleeve bearing supporting an end of said shaft.
3. The engine cooling module according to claim 1, wherein said armature assembly comprises a steel core member and a winding set wound around said core member.
4. The engine cooling module according to claim 1, wherein said brush card assembly includes a plurality of tabs extending from a surface thereof and said housing includes a plurality of recesses, each said tab engaging, in a snap-fitted arrangement, an associated said recess to couple said brush card assembly to said housing to close said open end.
5. The engine cooling module according to claim 2, wherein said brush card assembly includes ventilation openings therein.
6. The engine cooling module according to claim 1, wherein said housing is made of steel and is over-molded with respect to said shroud structure.
7. An engine cooling module comprising:
    a shroud structure,
    a housing of a d.c. electric motor is formed integrally with said shroud structure, said housing having an open end, said motor having:
        a drive shaft,
        a heat sink fixed to said housing and disposed opposite said open end, said heat sink defining a seat for a bearing supporting said shaft,
        a flux ring assembly fixed with respect to said housing, said flux ring assembly including permanent magnets,
        an armature assembly in said housing and fixed to said shaft for rotation in response to a magnetic field generated by said magnets,
        a commutator in said housing and electrically connected with said armature assembly and mounted for movement with said armature assembly, and
        a brush card assembly coupled to said open end of said housing to define an end cap covering said open end, said brush card assembly having brushes associated with said commutator, and
    a fan coupled to said shaft for rotation therewith.
8. The engine cooling module according to claim 7, wherein said brush card assembly is in the from of a disk with said brushes mounted on a surface thereof, said surface carrying a sleeve bearing supporting an end of said shaft.
9. The engine cooling module according to claim 7, wherein said armature assembly comprises a steel core member and a winding set wound around said core member.
10. The engine cooling module according claim 7, wherein said brush card assembly includes a plurality of tabs extending from a surface thereof and said housing includes a plurality of recesses, each said tab engaging, in a snap-fitted arrangement, an associated said recess to couple said brush card assembly to said housing to close said open end.
11. The engine cooling module according to claim 8, wherein said brush card assembly includes ventilation openings therein.
12. The engine cooling module according to claim 7, wherein said heat sink is fixed to said housing via molded material.
13. The engine cooling module according to claim 7, wherein said flux ring assembly including said magnets are fixed to said housing via molded material.
14. The engine cooling module according to claim 7, wherein said housing is made of steel and is over-molded with respect to said shroud structure.

\* \* \* \* \*